US007421653B2

(12) United States Patent
Ivanovic et al.

(10) Patent No.: US 7,421,653 B2
(45) Date of Patent: Sep. 2, 2008

(54) SYSTEM AND METHOD UTILIZING DRAWING HANDLERS FOR SELECTED PROPERTIES

(75) Inventors: Relja Ivanovic, Redmond, WA (US); David G. De Vorchik, Seattle, WA (US); Chris J. Guzak, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 621 days.

(21) Appl. No.: 10/729,853

(22) Filed: Dec. 5, 2003

(65) Prior Publication Data

US 2005/0122326 A1    Jun. 9, 2005

(51) Int. Cl.
G06F 3/00    (2006.01)
(52) U.S. Cl. ...................................... 715/700
(58) Field of Classification Search ................. 715/700, 715/771, 968; 707/100
See application file for complete search history.

(56) References Cited

U.S. PATENT DOCUMENTS

| | | | | | |
|---|---|---|---|---|---|
| 5,946,678 | A | * | 8/1999 | Aalbersberg | 707/3 |
| 6,094,648 | A | * | 7/2000 | Aalbersberg | 707/3 |
| 6,282,548 | B1 | * | 8/2001 | Burner et al. | 707/104.1 |
| 6,323,852 | B1 | * | 11/2001 | Blower et al. | 715/804 |
| 7,149,716 | B2 | * | 12/2006 | Gatto | 705/36 R |
| 2002/0049687 | A1 | * | 4/2002 | Helsper et al. | 706/45 |
| 2003/0078756 | A1 | * | 4/2003 | Couchot et al. | 702/182 |
| 2004/0070594 | A1 | * | 4/2004 | Burke | 345/716 |
| 2004/0217228 | A1 | * | 11/2004 | Scozzafava | 244/6 |
| 2006/0168340 | A1 | * | 7/2006 | Heller et al. | 709/242 |

OTHER PUBLICATIONS

ContainerListView and TreeListView: Writing VS.NET design-surface compatible controls, Jon Rista, Jan. 14, 2003, From: http://www.codeproject.com/cs/miscctrl/extendedlistviews.asp?target=listview.*
Neat Stuff to do in List Controls Using Custom Draw, Michael Dunn, Nov. 30, 1999, From: http://www.codeproject.com/listctrl/lvcustomdraw.asp.*
Lin, Y.-T., and S.-S. Tseng, "A Characterized Rating Recommended System," *Proceedings of the 5th Pacific-Asia Conference on Advances in Knowledge Discovery and Data Mining*, Hong Kong, China, Apr. 16-18, 2001, in *Lecture Notes in Artificial Intelligence 2035*:41-46, 2001.
Welch, S.R., et al., "Protocol Data Management System File Structure and User Interface," *Proceedings of the MUMPS Users' Group Meeting—MUMPS Investment for the 1990's*, Atlanta, Georgia, Jun. 8-12, 1987, in *MUG Quarterly 17*(1):32-37, 1987.

* cited by examiner

*Primary Examiner*—Stephen Hong
*Assistant Examiner*—Samir Termanini
(74) *Attorney, Agent, or Firm*—Birch, Stewart, Kolasch & Birch, LLP

(57) ABSTRACT

A system and method for providing graphical representations for selected properties. The system draws each item based on the type of property being shown. For example, for selected types of properties, the drawing may be delegated to a drawing handler component for that specific type of property. For example, if a music rating is being displayed, a special drawing handler component handles the drawing, which, in one example embodiment may be a number of graphical stars. The system is architected so that the drawing handlers are registered independently of the other system components, such that new types of drawing handlers can be added without requiring changes to the other system components. This allows for greater flexibility and simplifies updates to the drawing handlers.

12 Claims, 7 Drawing Sheets

SYSTEM AND METHOD UTILIZING DRAWING HANDLERS FOR SELECTED PROPERTIES

FIELD OF THE INVENTION

The present invention relates to computer file systems, and more particularly, to the graphical representation of selected file properties.

BACKGROUND OF THE INVENTION

Information about files may be displayed in various formats. In a simple list format, the only information that is displayed about a file may be its name. In an icon mode, an icon for the file may be included along with the file name. However, it is sometimes desirable to display additional information about files.

Known file systems are able to show more information about a file than just the name and/or icon of the file. For example, in one view a known file system may display each file's name, size, modified date, etc. In general, this information is presented only in textual form. The presentation of the data in textual form has drawbacks for certain types of information which would be better represented in a graphical format. The embodiment of the present invention is related to providing a system and method that overcome the foregoing and other disadvantages. More specifically, the embodiment of the present invention is related to a system and method for utilizing independent drawing handlers which are separately registrable and which provide graphical representations of selected file properties.

SUMMARY OF THE INVENTION

A system and method utilizing drawing handlers for selected file properties is provided. In accordance with one aspect of the invention, the system draws each item based on the type of property being shown. For example, if the system is displaying a name, the name may be drawn simply as text. However, for selected types of properties, the drawing may be delegated to a drawing handler component for that specific type of property. For example, if a music rating is being displayed, a special drawing handler component handles the drawing, which in one example embodiment may be graphical stars.

In accordance with another aspect of the invention, the system is architected so that the drawing handlers are registered independently of the operating system. This means that new types of drawing handlers can be added without changing other system components. This allows for greater flexibility and simplifies updates to the drawing handlers.

In accordance with another aspect of the invention, the system may include a list view component, an implementation component, and one or more drawing handler components. In general, the list view component may be responsible for elements such as a calculation of how big the icon for the item should be, how much space each item takes up on the screen, and moving items around. The list view component thus generally takes care of the display and what the user sees on the screen. The implementation component is generally responsible for telling the list view component what to paint, and to collect the items from a folder, and insert them into the list view component, and to answer the list view component's questions. So when the list view component queries for the value of a property, the implementation component supplies the value. The drawing handler components are generally assigned to specific properties for the files or items. In other words, when a drawing handler component is assigned to a specific property, when the implementation component is queried for information regarding the property, the implementation component instead goes to the drawing handler component for doing a custom drawing for the property. One example is a song rating that is represented with a number of stars. In one embodiment, the drawing handler component may be utilized without a list view component (e.g. used with just an implementation component that goes to the drawing handler component for drawings.)

In accordance with another aspect of the invention, when a custom drawing is to be done, the implementation component sends to the drawing handler component the value of the property and the area where the graphics are to be drawn. The drawing handler component then interprets the value of the property as a graphical representation and then draws the graphical representation in the designated area. As one example where a song rating is represented with a number of stars, the value of the property may be a number such as 75 (representing a rating of 75 out of 100), for which the drawing handler converts the number 75 into three stars (out of a total of four possible stars).

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
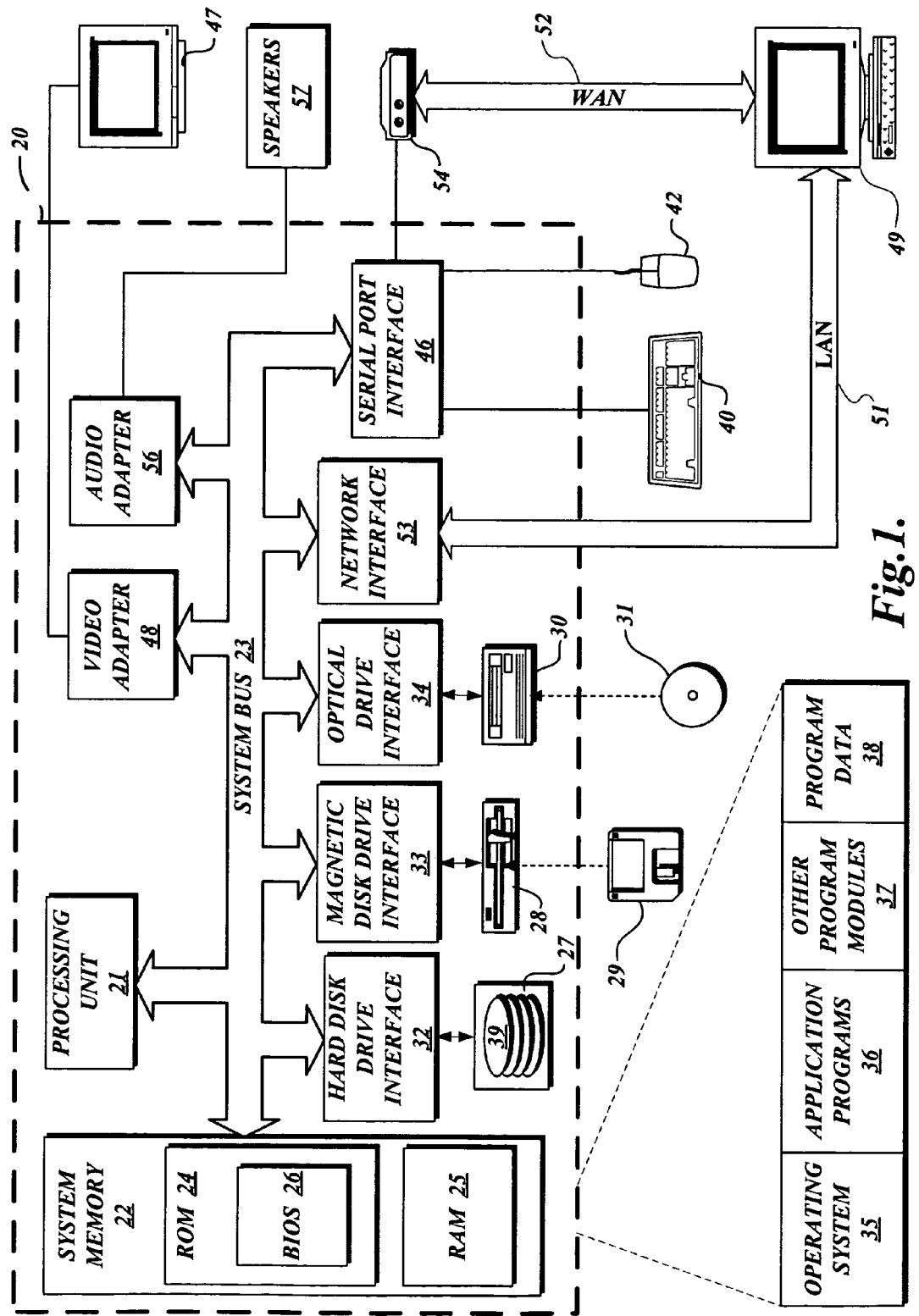
FIG. 1 is a block diagram of a general purpose computer system suitable for implementing the embodiment of the present invention.

A system and method for representing selected properties to a user in a graphical format is provided. The system draws each item in a list based on what kind of property is being shown. For example, if a name is being shown, it is drawn as text. For selected types of properties, the drawing is delegated to a drawing component for that specific type of property. For example, if a music rating is being displayed, a drawing handler component in one example embodiment handles the drawing of graphical stars. In one embodiment, the drawing handlers may be registered independently of certain other system elements. This provides the advantage that updates to the drawing handlers may be provided without requiring changes to other system components.

FIG. 1 and the following discussion are intended to provide a brief, general description of a suitable computing environment in which the embodiment of the present invention may be implemented. Although not required, the invention will be described in the general context of computer-executable instructions, such as program modules, being executed by a personal computer. Generally, program modules include routines, programs, characters, components, data structures, etc., that perform particular tasks or implement particular abstract data types. As those skilled in the art will appreciate, the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that helps to transfer information between elements within the personal computer 20, such as during start-up, is stored in ROM 24. The personal computer 20 further includes a hard disk drive 27 for reading from or writing to a hard disk 39, a magnetic disk drive 28 for reading from or writing to a removable magnetic disk 29, and an optical disk drive 30 for reading from or writing to a removable optical disk 31, such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer-readable instructions, data structures, program modules, and other data for the personal computer 20. Although the exemplary environment described herein employs a hard disk 39, a removable magnetic disk 29, and a removable optical disk 31, it should be appreciated by those skilled in the art that other types of computer-readable media which can store data that is accessible by a computer, such as magnetic cassettes, flash memory cards, digital video disks, Bernoulli cartridges, random access memories (RAMs), read-only memories (ROMs), and the like, may also be used in the exemplary operating environment.

A number of program modules may be stored on the hard disk 39, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus 23, but may also be connected by other interfaces, such as a parallel port, game port or a universal serial bus (USB). A display in the form of a monitor 47 is also connected to the system bus 23 via an interface, such as a video card or adapter 48. One or more speakers 57 may also be connected to the system bus 23 via an interface, such as an audio adapter 56. In addition to the display and speakers, personal computers typically include other peripheral output devices (not shown), such as printers.

The personal computer 20 may operate in a networked environment using logical connections to one or more personal computers, such as a remote computer 49. The remote computer 49 may be another personal computer, a server, a router, a network PC, a peer device or other common network node, and typically includes many or all of the elements described above relative to the personal computer 20. The logical connections depicted in FIG. 1 include a local area network (LAN) 51 and a wide area network (WAN) 52. The LAN 51 and WAN 52 may be wired, wireless, or a combination thereof. Such networking environments are commonplace in offices, enterprise-wide computer networks, intranets, and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20 or portions thereof may be stored in the remote memory storage device. It will be appreciated that the network connections shown are exemplary, and other means of establishing a communications link between the computers may be used.

Figure 2:
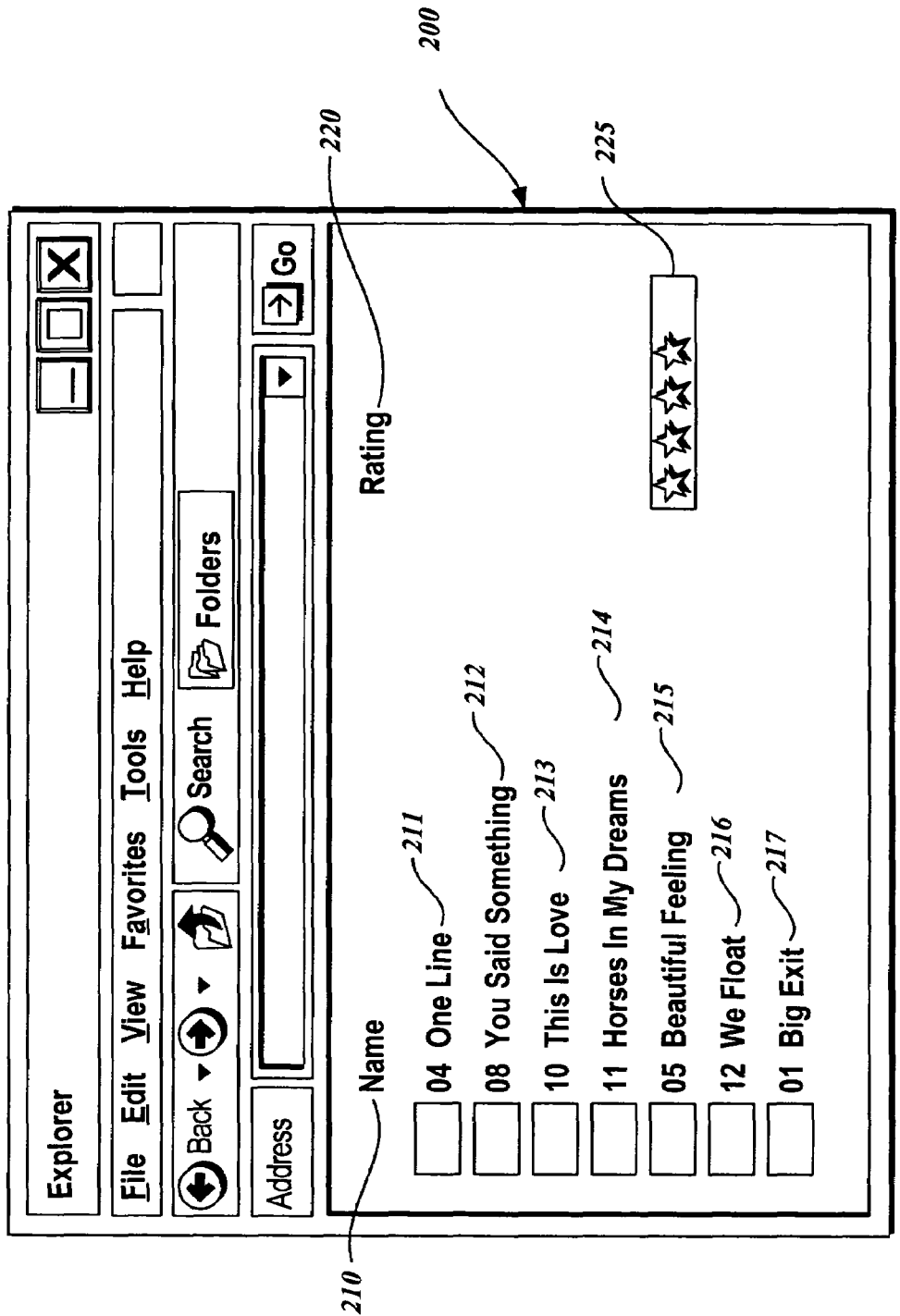
FIG. 2 is a diagram illustrative of a screen display showing a graphical representation of a rating property.

FIG. 2 is a diagram illustrative of a screen display 200 showing a graphical representation of a rating property. As illustrated in FIG. 2, the screen display 200 includes a name column 210 and a rating column 220. Under the name column, music files 211-217 are shown. Each music file 211-217 has an icon on the left, a numerical indicator in the middle, and a file name on the right.

On the right side of the screen display 200, in the rating column 220, a rating 225 is shown for the music file 215. More specifically, the music file 215 (for the song "Beautiful Feeling") is shown to have a rating 225 of four stars. In one embodiment, the rating of four stars may be out of a total of five possible stars, and as will be discussed in more detail below, may indicate a certain numerical rating. For example, in one embodiment a numerical rating of 1-20 may be represented as one star, 21-40 as two stars, 41-60 as three stars, 61-80 as four stars and 81-100 as five stars. A drawing handler component utilizes these ranges to convert a numerical rating into a graphical representation in terms of a number of stars. An implementation component provides the drawing handler component with the numerical rating, as well as information regarding where the graphical representation should be drawn on the display.

Figure 3:
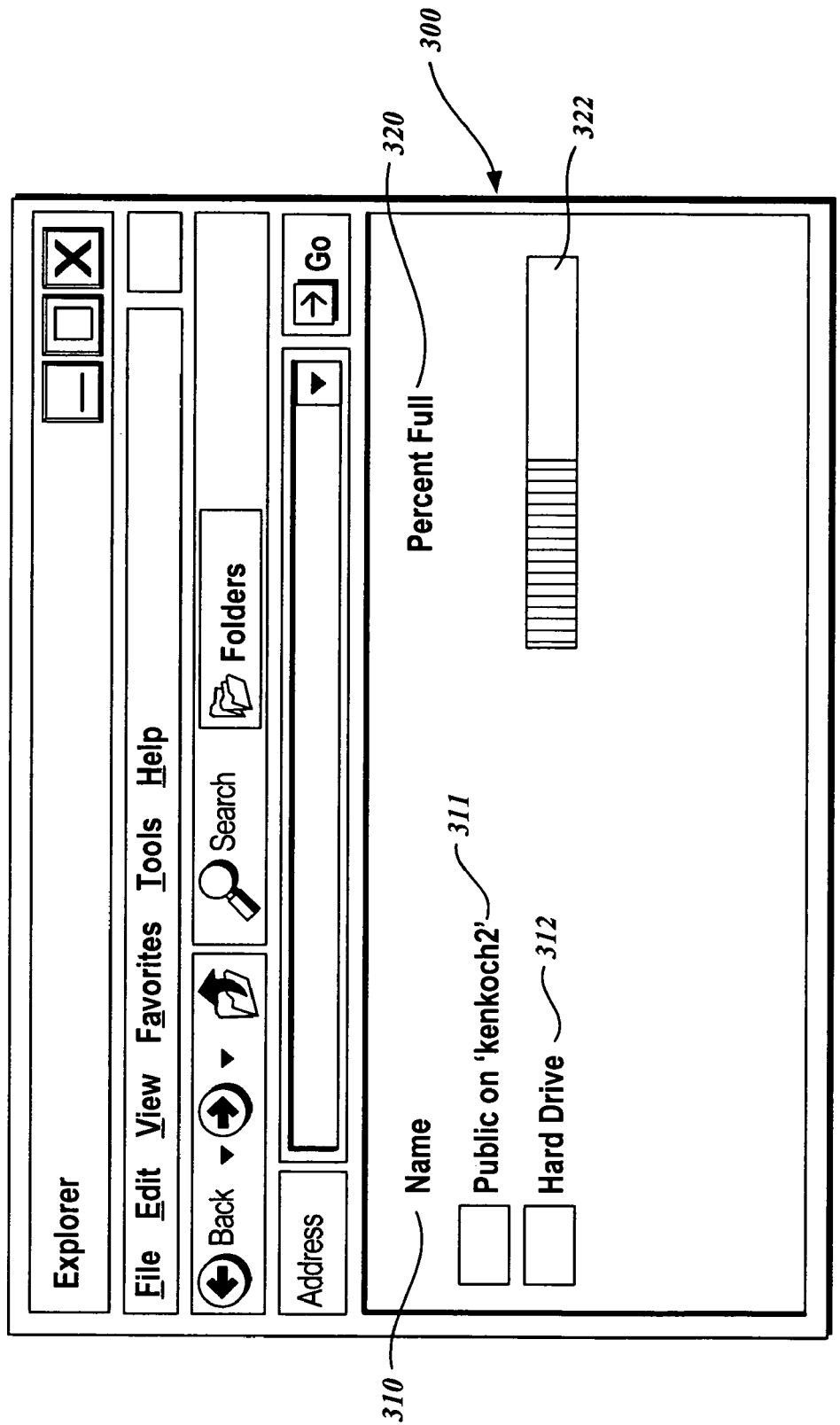
FIG. 3 is a diagram illustrative of a screen display showing a graphical representation of a percent full property.

FIG. 3 is a diagram illustrative of a screen display 300 showing a graphical representation of a percent full property. As shown in FIG. 3, the screen display 300 includes a name column 310 and a percent full column 320. Under the name column 310, storage drives 311 and 312 are shown. Under the percent full column 320, a representation 322 graphically indicates how full the hard drive 312 is indicated to be. As will be described in more detail below, the graphical representation 322 is representative of a numerical property for the percent full column. For example, if the percent full property for the hard drive 312 has a value of 50 (indicating 50% full), then a drawing handler component will convert the numerical value 50 to a graphical representation, such as that shown in graphical representation 322.

Figure 4:
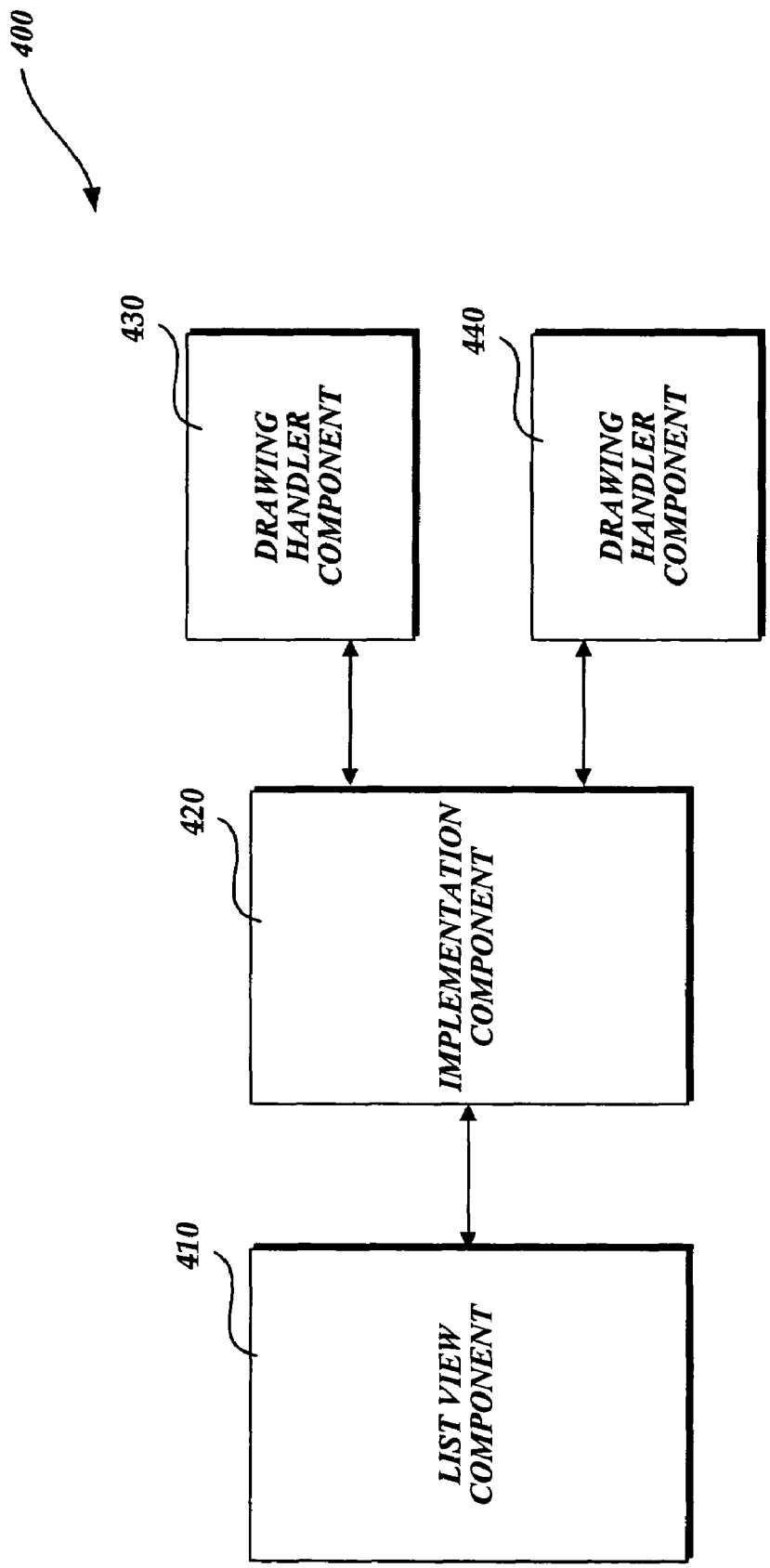
FIG. 4 is a block diagram of a computer system including a list view component, an implementation component, and drawing handler components.

FIG. 4 is a block diagram of a computer system 400. As shown in FIG. 4, the computer system 400 includes a list view component 410, an implementation component 420, and drawing handler components 430 and 440. In general, the list view component 410 may be responsible for elements such as a calculation of how big the icon for the item should be, how much space each item takes up on the screen, and moving items around. The list view component 410 thus generally takes care of the display and what the user sees on the screen. The implementation component 420 is generally responsible for telling the list view component 410 what to paint, and to actually collect the items from a folder, and insert them into the list view component 410, and to answer the list view component's 410 questions. So when the list view component 410 queries for the value of a property, the implementation component 420 supplies the value. The drawing handler components 430 and 440 are generally assigned to specific properties for the files or items. In other words, when a drawing handler component 430 is assigned to a specific property, when the implementation component 420 is queried for information regarding the property from the list view component 410, the implementation component 420 instead goes to the drawing handler component 430 for doing a custom drawing for the property. One example is a song rating that is represented with a number of stars.

Figure 5:
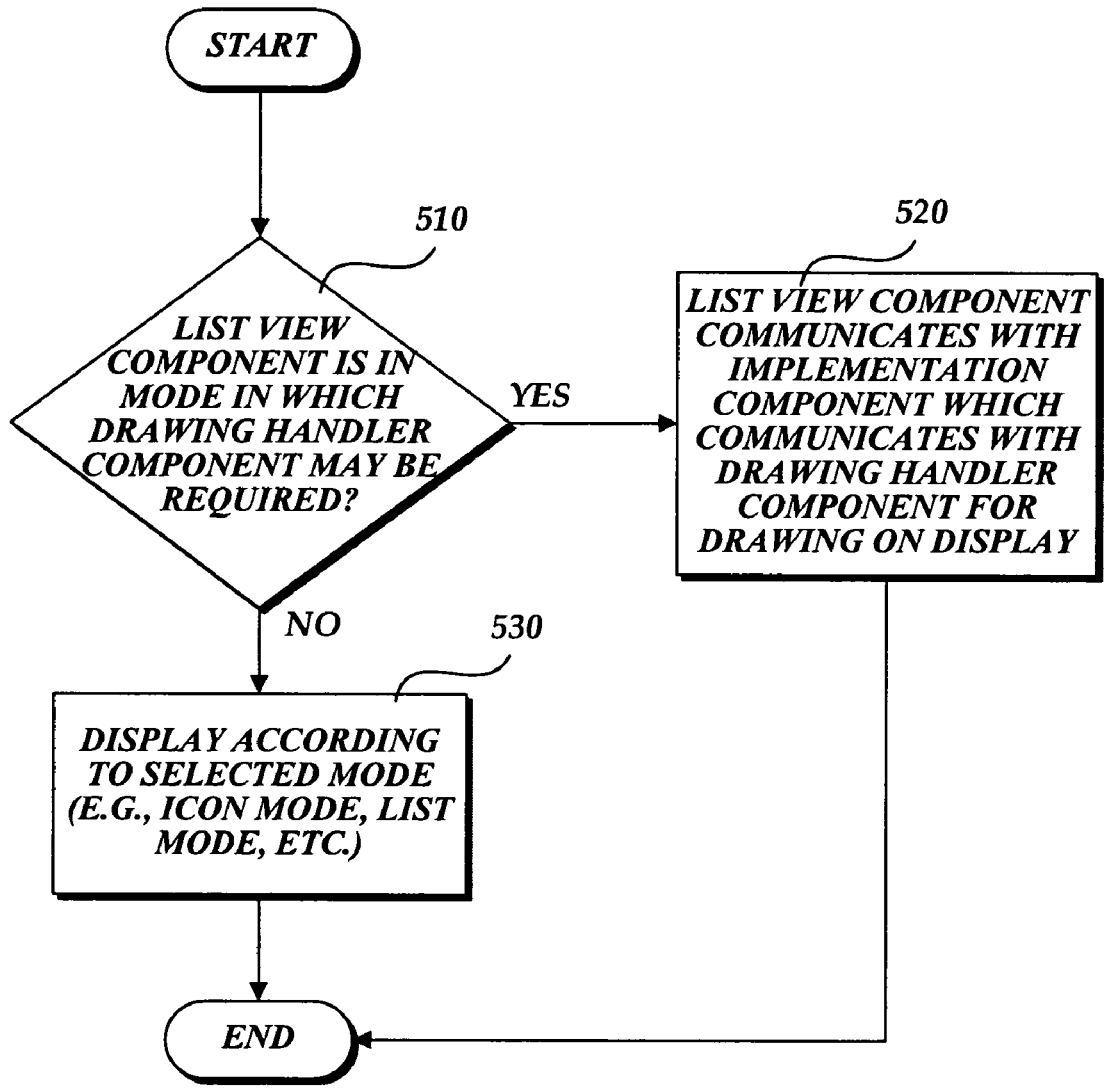
FIG. 5 is a flow diagram illustrative of a routine for determining whether a drawing handler component will be utilized for the representation of a property on the display.

FIG. 5 is a flow diagram illustrative of a routine 500 for determining whether a drawing handler component will be utilized. At a decision block 510, a determination is made as to whether the list view component is in a mode in which a drawing handler component may be utilized. In one embodiment, modes for which a drawing handler component may be required may include modes such as a tile mode and a details mode. In a tile mode, the display includes an icon on the left, and then a name and then a designated property. In one embodiment for the tile mode, different files have different properties that are shown, and the user cannot choose which ones those are, as they are predetermined. However, in a details mode, multiple columns may be provided with multiple properties, and the user may be able to turn on and off the columns. Other modes for which the drawing handler component may not be required may include modes such as an icon mode or a list mode. In the icon mode, only the icon and selected text are displayed, wherein in the list mode, there is just a name column.

From decision block 510, if the last view component is in a mode where a drawing handler component may be required, then the routine continues to a block 520, where when the list view component communicates with the implementation component, the implementation component may then communicate with a drawing handler component for drawing on the display. If at decision block 510 it is determined that the list view component is in a mode where a drawing handler component is not required, then the routine continues to a block 530, where when the list view component communicates with the implementation component, a drawing handler component is not called and the designated information is displayed according to the selected mode (e.g., an icon mode, a list mode, etc.).

Figure 6:
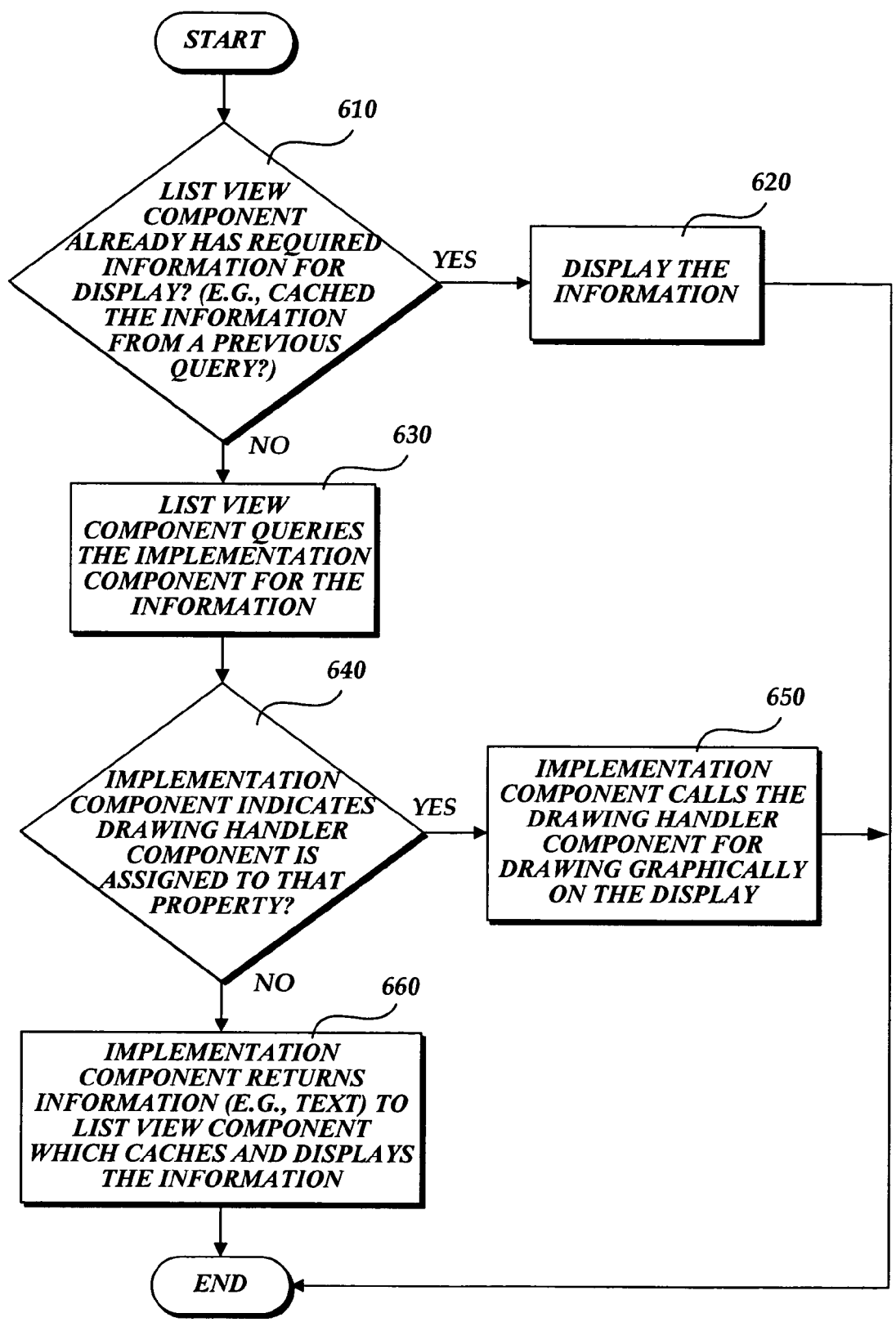
FIG. 6 is a flow diagram illustrative of a routine for representing properties on a display.

FIG. 6 is a flow diagram illustrative of a routine 600 for providing information on a display regarding selected files. At a decision block 610, a determination is made as to whether the list view component already has the required information for the display. As one example of a situation where the list view component may already have the required information, from a previous query, the list view component may have already cached the required information. If at decision block 610 it is determined that the list view component already has the required information, then the routine proceeds to a block 620, where the required information is displayed. If at decision block 610 it is determined that the list view component does not already have the required information, then the routine proceeds to a block 630.

At block 630, the list view component queries the implementation component for the information. At a decision block 640, a determination is made as to whether the implementation component has determined that a drawing handler component has been assigned to the property for which the information is being queried. If a drawing handler component is assigned, then the routine proceeds to a block 650, where the implementation component calls the drawing handler component for drawing graphically on the display. If at decision block 640 it is determined that there is no drawing handler component assigned for the property, then the routine proceeds to a block 660, where the implementation component returns the desired information (e.g., text) to the list view component, which then caches and displays the information.

Figure 7:
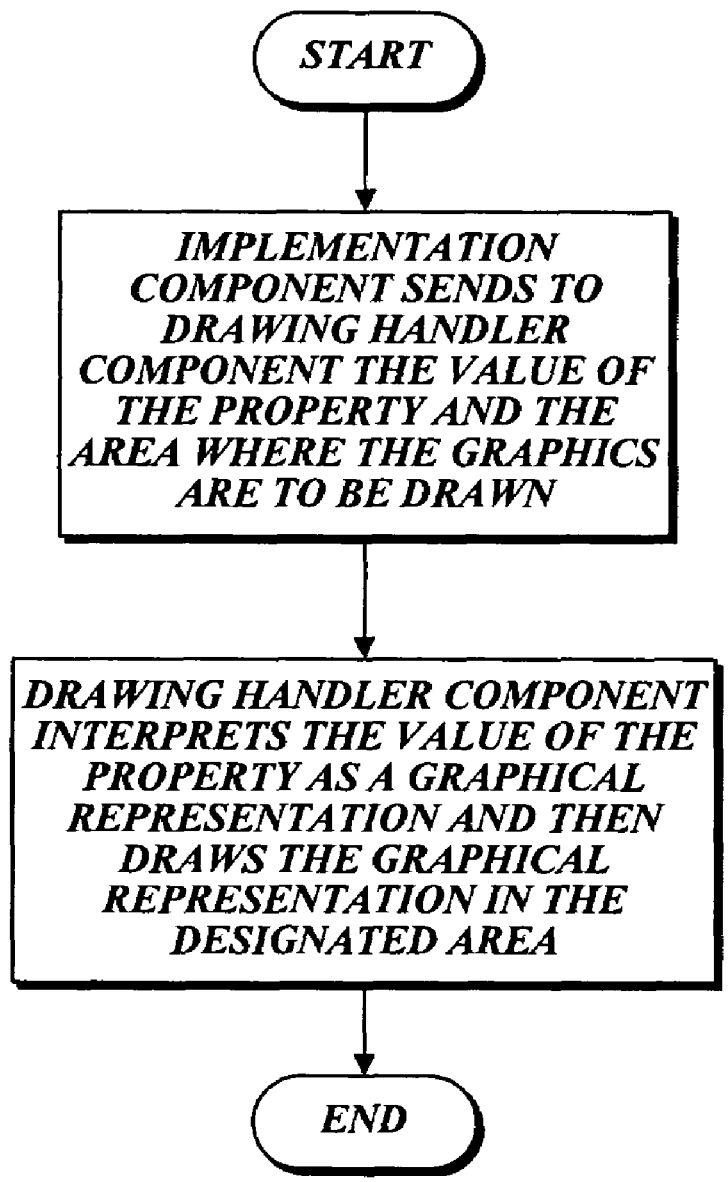
FIG. 7 is a flow diagram illustrative of a routine for providing information to a drawing handler for doing a custom drawing to represent a property.

FIG. 7 is a flow diagram illustrative of a routine 700 by which the drawing handler component converts the property value into a graphical representation. At a block 710, the implementation component sends to the drawing handler component the value of the property and the area where the graphics are to be drawn. At a block 720, the drawing handler component interprets the value of the property as a graphical representation and then draws the graphical representation in the desired area.

As one example of a conversion of a value of a property to a graphical representation, in one embodiment, a numerical rating of 1-20 may be represented as one star, 21-40 as two stars, 41-60 as three stars, 61-80 as four stars and 81-100 as five stars. The drawing handler component utilizes these ranges to convert a numerical rating into a graphical representation in terms of a number of stars. For example, a music file with a numerical rating of 75 would in this example receive a graphical rating representation of four stars.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for representing a property on a display, comprising:
   a drawing handler from amongst a plurality of drawing handlers being assigned to the property;
   the drawing handler being called by an implementation component to provide a graphical representation of the property; and
   the drawing handler converting a value for the property received from the implementation component into a graphical representation which is provided on the display,
   wherein a list view component which is responsible for the presentation on the display communicates with the item implementation component,
   wherein the list view component has different modes, including at least one mode for which the drawing handler component may be required, and at least one mode for which the drawing handler component will not be required, and wherein the list view component has a details mode in which the drawing handler component may be required, the details mode may include multiple columns, where the user is able to cancel one or more of said multiple columns by turning the canceled one or more columns off, that would otherwise require the drawing handler component.

2. The method of claim 1, wherein the graphical representation includes a number of elements, and the number of elements is proportional to a numerical value of the property.

3. The method of claim 1, wherein the drawing handler component is registered independently of the other system components.

4. The method of claim 1, wherein the property represents a rating value of an item.

5. The method of claim 1, wherein the property represents a physical characteristic of an item.

6. The method of claim 1, wherein a plurality of drawing handlers are assigned to a plurality of properties.

7. The method of claim 1, wherein additional drawing handlers may be independently registered and assigned to different properties.

8. A method of representing a property on a display, comprising:

an implementation component issues a call for providing a graphical representation of a property on the display; and in response to the call, a drawing handler component specific to the property produces the graphical representation for the property on the display, wherein a list view component communicates with the implementation component and organizes the presentation of information on the display, wherein the list view component has different modes, including at least one mode for which the drawing handler component may be required, and at least one mode for which the drawing handler component is not required, and wherein the list view component has a details mode, in which the user may select or cancel one or more columns from amongst a plurality of columns that may be included in said details mode which requires the use of the drawing handler component, where the canceled one or more columns is turned off.

9. The method of claim 8, wherein the graphical representation includes a number of elements, the number of elements being proportional to the numeric value of the property.

10. The method of claim 8, wherein the drawing handler component is independently registered.

11. The method of claim 8, wherein the drawing handler component may be modified without requiring modifications to other system components.

12. The method of claim 8, wherein a plurality of drawing handler components are utilized for creating graphical representations for a plurality of properties.

* * * * *